3,183,808
SYSTEM FOR AUTOMATICALLY CONTROLLING DIAPHRAGM FOR PHOTOGRAPHIC CAMERA
Haruo Teshi and Fumio Sakaki, Nagoya, Japan, assignors to Elmo Company Limited, Nagoya, Japan
Filed Apr. 19, 1963, Ser. No. 274,266
Claims priority, application Japan, May 1, 1962, 37/17,991
6 Claims. (Cl. 95—10)

This invention relates ot a system for automatically controlling a diaphragm device for a photographic camera which may be either a still camera or a motion picture camera.

It is an object of the invention to provide, in a photographic camera including an exposure meter such as a body of photoconductive material self-contained therein, an improved system for automatically controlling a diaphragm device for a photographic objective in accordance with the brightness of an object to be photographed in a simple and reliable manner.

With the above object in view, the invention resides in a system for automatically controlling a diaphragm device for a photographic camera, comprising diaphragm means, a body of photoconductive material in the rear of said diaphragm means arranged to have an amount of light falling upon the same through said diaphragm means, separate diaphragm means for a photographic objective operative to interlock with said firstmentioned diaphragm means to have the area of the diaphragm aperture varied in accordance with that of said diaphragm means, an electrical balancing circuit including said body of photoconductive material operative to drive said firstmentioned diaphragm means until said body of conductive material has a resistance equal to a predetermined magnitude with which the electrical circuit is balanced, said separate diaphragm means defining a diaphragm aperture for a photosensitive member having such an area that an amount of light passing through the aperture to the photosensitive member gives a proper exposure to the photosensitive material whenever said body of photoconductive material as exposed to light has a resistance equal to said predetermined magnitude.

The invention will become more readily apparent from the following detailed description taken in conjunction with the accompanying drawings in which.

Figure 1:
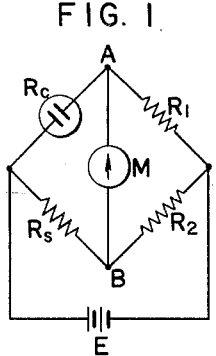
FIG. 1 shows a schematical electrical diagram of the well-known Wheatstone bridge suitable for use with the invention.

Referring now to FIG. 1 of the drawings, there is illustrated an electric bridge of the Wheatstone type suitable for use with the invention. The Wheatstone bridge is well known to those skilled in the art and comprises two current paths one of which includes a resistor $R_c$ and a resistor $R_1$ serially connected to the same and the other current path includes a resistor $R_s$ and a resistor $R_2$ serially connected to the resistor $R_s$. The junction of the resistor $R_c$ and $R_s$ is connected to one terminal of a source of direct current E, in this case a positive terminal thereof, while the junction of the resistors $R_1$ and $R_2$ is connected to the negative terminal of the source E. Between the junction A of the resistors $R_c$ and $R_1$ and the junction B of the resistors $R_s$ and $R_2$ a galvanometer M is connected.

Assuming that $R_c$, $R_1$, $R_s$ and $R_2$ represent also the magnitudes of resistance of the thus designated resistors, it is well known that, if $$R_s R_1 = R_c R_2$$

the bridge is in its balanced state with the result that no current flows through the galvanometer M. On the other hand, if $R_s R_1 \neq R_c R_2$ then the bridge is not balanced resulting in a flow of current through the galvanometer M in either direction as the case may be. For example, when $R_1 = R_2 = R_s = 10,000$ ohms and $R_c = 5,000$ ohms a current will flow through the galvanometer M in the direction from the junction A to the junction B. However, when $R_1 = R_2 = R_s = 10,000$ ohms and $R_c = 15,000$ ohms a current will flow through the galvanometer M in the direction from the junction B toward the junction A.

It is now assumed that the resistor $R_c$ forming one arm of the Wheatstone bridge shown in FIG. 1 comprises a body of photoconductive material such as cadmium sulfide and also that a certain amount of light is incident upon the body of photoconductive material to put the Wheatstone bridge in its balanced state. Under these circumstances, any change in the amount of light incident upon the body of photoconductive material causes a great variation in resistance of the latter to unbalance the bridge. Thus it will be appreciated that a current flows through the galvanometer M in one or the other direction in accordance with increase or decrease in the amount of light respectively and has its magnitude determined by the change in the amount of light. This flow of current will then swing an indicating pointer (not shown) provided on the galvanometer M in the corresponding direction.

Therefore, it will be appreciated that, if a pair of diaphragm devices adapted to be driven in accordance with a swing of a galvanometer pointer are provided in front of an exposure meter comprising a body of photoconductive material and a photographic objective is associated with the same respectively and that if an amount of light incident upon the exposure meter will be changed that the diaphragm device in front of the exposure meter will be stopped at its aperture position where the body of photoconductive material has a resistance of $R_c$ at which a Wheatstone bridge such as shown in FIG. 1 is balanced. In this way, the exposure meter will have its intensity of illumination maintained substantially constant. Accordingly when the diaphragm device for controlling an amount of light falling upon the exposure meter is designed and arranged to operate in a predetermined relationship with the diaphragm device associated with the photographic objective a frame of a photosensitive member can be given a predetermined exposure whenever it is desired to do so provided that the exposure time is always constant. Also, in order to vary said predetermined exposure in accordance with a sensitivity of a photosensitive member for example, one of the ratio arms of the Wheatstone bridge is required to have the magnitude of resistance varied.

Figure 2:
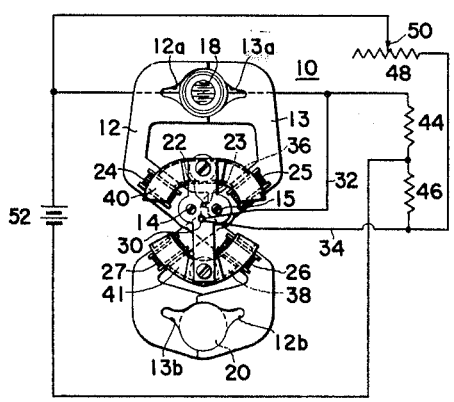
FIG. 2 shows schematically a plan view of a device constructed in accordance with the teachings of the invention and also illustrates a schematic diagram of an electrical circuit used with the same.

The invention is based upon the principle just described and will now be described in conjunction with FIGS. 2 and 3 of the drawings wherein one embodiment thereof is illustrated. As best shown in FIG. 2, diaphragm means generally designated by the reference numeral 10 comprises a pair of diaphragm leaves 12 and 13 in the form of a curved lever having formed in the enlarged free end portions notches 12a, 12b, 13a and 13b respectively and arranged in symmetrical relationship such that both free end portions of one of the diaphragm leaves are opposed to the corresponding end portions of the other leaf for overlapping movement toward and away from each other to define diaphragm apertures therebetween respectively and that the intermediate portions of the levers across each other in an X shape adjacent to their centers and are pivotably mounted adjacent to the centers on the respective pivot pins 14 and 15 which, in turn are suitably carried on a camera housing diagrammatically represented by a dot-and-dash line 16 shown in FIG. 3.

Disposed in the rear of one of the apertures for example the upper aperture 12a–13a as viewed in FIG. 2 is an exposure meter 18 comprising a body of any suitable photoconductive material such as cadmium sulfide and in the rear of the other or lower aperture 12b–13b a photographic objective 20 is disposed with the optical axis of the objective passing through the center of the aperture.

Those portions of the diaphragm leaves positioned between the two pivot pins 14 and 15 are provided with a small notch 22 and a pin 23 adapted to engage the same respectively for a purpose which will be apparent hereinafter. With the arrangement illustrated, the diaphragm leaf 12 is provided with the notch 22 while the other leaf 13 provided with the pin 23.

In addition, each of the diaphragm leaves 12 and 13 includes a pair of electrical windings 24 and 26 or 25 and 27 rigidly secured thereto adjacent to its fulcrum 14 or 15 in opposed relationship with the central axis of the same contacting a circle having its center substantially coinciding with the intersection of the diaphragm leaves and with the associated fulcrum disposed therebetween. The four windings 24, 25, 26 and 27 are electrically connected in series to one another and adapted to symmetrically drive the diaphragm leaves 12 and 13 in the opposite directions upon energization.

Figure 3:
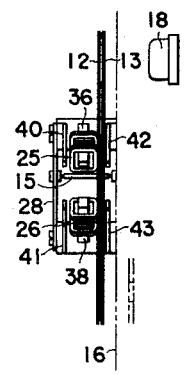
FIG. 3 shows a side elevational view of the device illustrated in FIG. 2.

In order to support the other ends of pivot pins 14 and 15 as previously described a supporting bracket 28 is suitably secured to a camera housing diagrammatically represented by the dot-and-dash line 16 illustrated in FIG. 3. The bracket 28 is provided on that portion thereof near to the fulcrum 14 and 15 with a small hole 30 through which extend a pair of leads 32 and 34 to the windings so as not to impair movement of the diaphragm leaves.

A pair of permanent magnets of arcuate shape 36 and 38 are suitably secured to the bracket 28 in such a manner that they loosely extend through the windings 24, 25 and 27 and 26 respectively for a purpose to be explained hereinafter. Further, a pair of magnetic pieces 40 and 42 of arcuate shape are provided one on each side of magnet 36 and a further pair of arcuate pieces 41 and 43 are provided one on each side of magnet 38 such that the magnetic pieces 40 and 41 are positioned between the inside face of the bracket 28 and the adjacent sides of the windings 24 and 25 and windings 26 and 27 respectively while the other magnetic pieces 42 and 43 are positioned between the diaphragm leaves 12 and 13 and the windings, the magnetic pieces being substantially coextensive with and aligned with the associated magnets. With this arrangement, the magnetic flux can easily pass from one end of the magnet 36 or 38 through the associated magnetic pole pieces 40 and 42 or 41 and 43 and back to the other end of the magnet with the result that the magnetic pole pieces provide low reluctance paths for the associated magnets.

The lead 32 is connected to the junction of the exposure meter 18 and a resistor 44 and the lead 34 is connected to a junction of a resistor 46 connected in series with the resistor 44 and a resistor 48 illustrated as a variable resistor 48. The junction of the resistors 44 and 46 is connected to one terminal, in this case a negative terminal, of a source of direct current illustrated as a battery 52, while the movable tap 50 of the resistor 48 or the junction of the same and the exposure meter 18 is connected to the positive terminal of the battery 52.

By comparing FIG. 1 with FIG. 2 it will be appreciated that the exposure meter 18, and resistors 44, 46 and 48 correspond to the resistance $R_c$ $R_1$, $R_2$ and $R_s$ respectively and form a Wheatstone bridge.

The movable tap 50 on the variable resistor 48 can be advantageously coupled to a knob (not shown) controlled in accordance with the sensitivity of a photosensitive film or sheet used. The resistor 48 may be, if desired, a fixed resistor.

With the exposure meter 18 exposed to light, the unbalance of the Wheatstone bridge permits current to flow through the windings 24, 26, and 25, 27 in either direction. The currents interact on the magnetic fields due to the magnets 36 and 38 to produce electromagnetic forces tending to drive the windings 24, 25 and 25, 27 and hence the diaphragm leaves 12 and 13 toward or away from each other to change in the apertures 12a–13a and 12b–13b. At the instant the change in the aperture 12a–13a causes the Wheatstone bridge to balance, the flows of current through the windings stop and hence the diaphragm leaves stop. Thus it will be appreciated that the provision of the magnetic pole pieces 40, 42, 41 and 43 serves to increase the strengths of field resulting from the magnets 36 and 38 and to enhance the forces of driving the diaphragm leaves.

It is now assumed that, when a ray of light from an object to be photographed falls upon the exposure meter 18 through the associated diaphragm aperture 12a–13a and also upon a photosensitive film or sheet (not shown) through the associated diaphragm aperture 13a–13b and the photographic objective 20 to give a proper exposure to the photosensitive sheet, that the body of photoconductive material in the exposure meter exhibits its resistance of $R_c$ and that the resistors 44, 46 and 48 are selected to have the respective magnitudes of resistance cooperating with $R_c$ to put the Wheatstone bridge in its balanced state. It is to be understood that the profiles of the notches 12a and 13a on the diaphragm leaves 12 and 13 defining the diaphragm aperture associated with the exposure meter 18 are designed and shaped such that said aperture permits an amount of light to be passed therethrough to the exposure meter to render the resistance of the body of photoconductive material equal to $R_c$ whenever the Wheatstone bridge is balanced. Also it is to be noted that in the balanced state of the Wheatstone bridge, the notches 12b and 13b on the diaphragm leaves 12 and 13 defining the diaphragm aperture associated with the photographic objective are designed and shaped to give a proper exposure to a photosensitive film or sheet.

Under these circumstances, if the brightness of an object to be photographed is changed or if an amount of light falling upon the exposure meter 18 is changed then the resistance of the photoconductor in the same will be varied to unbalance the Wheatstone bridge to thereby cause a current to flow through the windings 24 through 27. This flow of current through the windings produces magnetic fields which react with the fields of permanent magnets 36 and 38. This causes the diaphragm leaves 12 and 13 to symmetrically swing toward or away from each other as the case may be with the result that the amount of light falling upon the exposure meter is controlled to vary the resistance of the photoconductor. The notch 22 and pin 23 have been provided for the purpose of insuring this symmetrical movement of the diaphragm leaves. When the resistance of the photoconductor has reached the balancing value of $R_c$ the Wheatstone bridge is balanced, at which point no current flows through the windings 24–27 resulting in no magnetic field being produced for the windings and in termination of movement of the diaphragm leaves.

Thus it will be appreciated that the invention can always give a photosensitive film or sheet a predetermined fixed exposure by the provision of an arrangement comprising a diaphragm device for a photographic objective adapted to interlock in a predetermined operative relationship with another diaphragm device for an exposure meter controlled by a Wheatstone bridge which is actuated by an amount of light falling upon the exposure meter through the latter diaphragm device.

It is to be understood that said predetermined fixed exposure may be varied by changing the magnitude of resistance of the variable resistor 48.

While the invention has been described in conjunction with a preferred embodiment thereof it is to be apparent to those skilled in the art that various changes in detail of the construction and the combination and arrangement of parts may be resorted to without departing from the spirit and scope of the invention. For example, instead of both diaphragm devices integral with each other, the diaphragm device for the photographic objective may be separated from the diaphragm device for the exposure meter and interlock in a predetermined operative relationship with the same through any suitable linkage. Also the Wheatstone bridge illustrated may be replaced by any other electrical balancing circuit well known to those skilled in the art.

What we claim is:

1. A system for automatically controlling a diaphragm device for a photographic camera, comprising a first diaphragm means, a body of photoconductive material in the rear of said first diaphragm means positioned to receive light falling upon the same through said first diaphragm means, second diaphragm means for a photographic objective and operatively connected to said first diaphragm means and movable so as to have the area of the second diaphragm aperture varied in accordance with the variation in aperture of said first diaphragm means, a single Wheatstone bridge type electrical balancing circuit including said body of photoconductive material and a resistance of a predetermined value, and driving means for said diaphragm means and comprising at least one permanent magnet member and a coil member therearound, the said members being movable relative to each other, one of said members being adapted to be fixed to the camera and the other member being fixed to one of said diaphragm means, and said coil member being in said balancing circuit in a position therein in which current flows through said coil member when the circuit is unbalanced, said second diaphragm means defining a diaphragm aperture for a photosensitive member having an area such that the amount of light passing through the aperture of the second diaphragm means to the photosensitive material properly exposes the photosensitive material whenever said body of photoconductive material when exposed to an amount of light passing through said first diaphragm means has a resistance equal to said predetermined value.

2. A system as claimed in claim 1 in which said driving means further comprises at least one pole piece of magnetic material extending parallel to said magnet member outside of said coil and being rigidly connected to said magnet member at at least one end thereof.

3. A system for automatically controlling a diaphragm device for a photographic camera, comprising a pair of diaphragm leaves each being in the form of a curved lever having enlarged free end portions with notches therein, said leaves being in symmetrical relationship such that the respective end portions of each of said diaphragm leaves are opposed to corresponding end portions of the other diaphragm leaf for overlapping movement toward and away from each other to define first and second diaphragm apertures therebetween respectively, said pair of diaphragm leaves each having an intermediate portion crossing the other in an X shape adjacent to the centers of the intermediate portions and being pivotally connected to each other at the crossing point, a body of photoconductive material in the rear of the first diaphragm aperture positioned to receive light falling upon the same through said first diaphragm aperture, a single Wheatstone bridge type electrical balancing circuit including said body of photoconductive material and a resistance of a predetermined value, and driving means for said diaphragm leaves and comprising at least one permanent magnet member and a coil member therearound for each diaphragm leaf, the said members being movable relative to each other, one of said members for each leaf being adapted to be fixed to the camera and the other member being fixed to the respective diaphragm leaf, said coil members being in said balancing circuit in a position therein in which current flows through said coil members when the circuit is unbalanced, said second diaphragm aperture having an area such that the amount of light passing through the second diaphragm aperture to a photosensitive material properly exposes the photosensitive material whenever said body of photoconductive material when exposed to an amount of light passing through said first diaphragm aperture has a resistance equal to said predetermined value.

4. A system as claimed in claim 3 in which said driving means comprises at least one pole piece of magnetic material for each magnet member, said pole piece extending parallel to said magnet member outside of the coil member associated with said magnet member and being rigidly connected to said magnet member at at least one end thereof.

5. A system as claimed in claim 3 in which said driving means comprises two pole pieces of magnetic material for each magnet member, said pole pieces extending parallel to said magnet member outside of the coil member associated with said magnet member, one pole piece being on one side of the coil member and the other pole piece being on the other side of the coil member, the pole pieces being rigidly connected to said magnet member at at least one end thereof.

6. A system as claimed in claim 3 in which one of said resistances in said balancing circuit is variable in magnitude for adjusting the balance position of said circuit and thereby adjusting the size of the aperture to which the diaphragm leaves will move.

References Cited by the Examiner

UNITED STATES PATENTS

| | | | |
|---|---|---|---|
| 2,902,963 | 9/59 | Barthruff | 95—10 |
| 3,074,336 | 1/63 | Hinden | 95—64 |

FOREIGN PATENTS

| | | |
|---|---|---|
| 1,223,439 | 2/60 | France. |
| 1,261,996 | 4/61 | France. |

NORTON ANSHER, *Primary Examiner.*

JOSEPH P. STRIZAK, *Examiner.*